United States Patent [19]
Fieldman

[11] 4,317,987
[45] Mar. 2, 1982

[54] REMOTE CONTROL DEVICE FOR A WATER HEATER

[76] Inventor: Dan I. Fieldman, 305 Circle West, Jupiter, Fla. 33458

[21] Appl. No.: 181,884

[22] Filed: Aug. 27, 1980

[51] Int. Cl.³ ............................................. H05B 1/02
[52] U.S. Cl. .................................. 219/506; 219/493; 219/327; 219/508; 236/47; 340/825.17
[58] Field of Search ............... 219/427, 321, 434, 322, 219/437, 327, 492, 493, 506, 332, 508–510; 236/47, 51; 340/147 R; 307/117, 39, 41

[56] References Cited
U.S. PATENT DOCUMENTS

| | | | |
|---|---|---|---|
| 3,597,588 | 8/1971 | Kirschner | 219/327 |
| 3,972,471 | 8/1976 | Ziegler | 236/51 |
| 3,989,928 | 11/1976 | Scragg et al. | 219/493 |
| 4,190,764 | 2/1980 | Decker | 219/506 |
| 4,196,848 | 4/1980 | Falkenstein | 236/47 |
| 4,214,148 | 7/1980 | Fleischhauer | 219/506 |

Primary Examiner—B. A. Reynolds
Assistant Examiner—M. Paschall

[57] ABSTRACT

A remote control device for controlling the operation of a conventional domestic water heater (18) used singularly or in conjunction with a solar heating system. The control device comprises a remote control head (10), which has an indicator (12) for conveying the status of the water heater (18) and the temperature of the water contained therein and a multi-positional manual switch (14) for selecting the mode of operation of the water heater (18) and a remote controlled heater switch (16), electrically connected to the remote control head (10), which controls power to the water heater (18) in response to signals from the remote control head (10). Therefore, the operation of the water heater can be controlled according to the needs of the user.

6 Claims, 8 Drawing Figures

REMOTE CONTROL DEVICE FOR A WATER HEATER

TECHNICAL FIELD

The present invention relates to a device for controlling the energization of water heaters and particularly to a remote control device which by manual selection can control the mode of operation of a water heater.

In controlling the energization of home water heaters, especially now that they are used in conjunction with solar water heaters, it is essential that the user be allowed a great deal of flexibility in the selection of a mode of operation of the water heater to meet both the individual needs of the user and to maximize energy conservation.

BACKGROUND ART

The prior art, U.S. Pat. No. 3,989,928, provided a pair of clock timers each having a disc for supporting a plurality of relay actuators in a spaced relationship to one another which couples power from a suitable source to the water heater via a seasonal thermostatic switch. On one of the discs the actuators are spaced for summer load conditions so that power to the water heater is inhibited when summer power demand is greatest; and on the other disc the actuators are spaced for winter load conditions so that power to the water heater is inhibited for a time when winter power demand is greatest.

DISCLOSURE OF INVENTION

In accordance with the present invention, a remote control device comprising a remote control head and a remote controlled heater switch is provided. The remote control head may be mounted on an interior wall in a location which is convenient for the user. The remote control head includes a three-position switch used to select the mode of operation of the water heater, a small solid state lamp which is used to display the status of the water heater and an electronic circuit board with components that control both the remote controlled heater switch and the solid state lamp. The heater switch includes a solid state switch, a small transformer which isolates the remote control head from the high voltage used to power the water heater. The remote controlled heater switch is normally located close to the water heater and is inserted in the power line between the wall socket and the water heater itself.

The remote controlled device possesses the advantage that the individual has total control of the water heater at his fingertips in order to meet the needs of the individual and conserve energy when hot water is not needed. Merely by changing the position of the three-position switch, the user can turn the water heater completely off, allow the water heater to heat through one cycle and then remain off, or allow the water heater to work in a conventional mode according to the temperature setting on the thermostatic switch in the water heater. The remote controlled device also is advantageous when used with a combination solar heater and electrical water heater. Normally, the solar water heater will sufficiently heat the water during the daytime hours and meet most of the needs of the user, however when the hot water supply is depleted and darkness sets in the electrical water heater will turn on to heat the water even though it may not be needed. The present invention llows the user to conveniently override the thermostatic switch of the electrical water heater without having to unplug the water heater from the wall socket which is both inconvenient and dangerous.

It is therefore an object of this invention to provide a remote controlled device which provides complete control of an electric water heater from a convenient preselected location.

It is another object of this invention to provide a remote controlled device which provides for manual selection of the mode of operation of the electric water heater.

It is another object of this invention to provide a remote controlled device which continually conveys the status of the electric water heater.

BEST MODE FOR CARRYING OUT THE INVENTION

Figure 1:
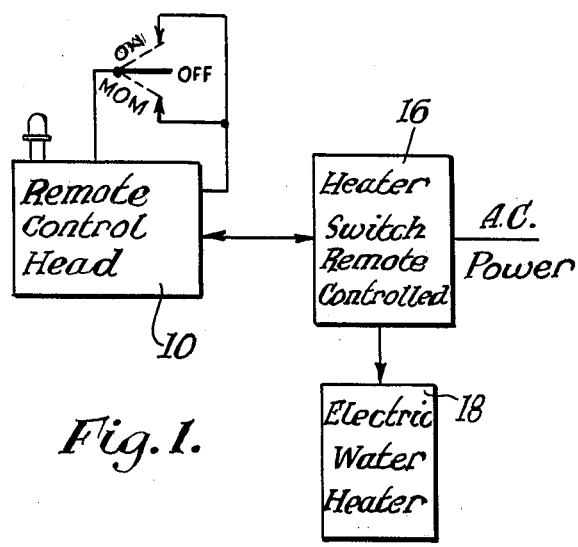
FIG. 1 is a block diagram of the system overview.

Referring to FIG. 1, the remote control head 10 includes a light emitting diode 12 in a three-position switch 14. The remote control head 10 is electrically coupled to the remote controlled heater switch 16. The heater switch 16 is also electrically connected to an AC power source and an electric water heater 18. When the three-position switch is placed in the ON position, the electric water heater 18 will operate in a conventional mode depending on the thermostatic switch contained therein to regulate the energization of the water heater 18. When the three-position switch 14 is moved to the OFF position the remote control head 10 disables the remote control heater switch 16 so that the electric water heater 18 cannot be energized. However, when the three-position switch 14 is placed in the momentary position, it allows the electric water heater 18 to go through one heating cycle, if thermostat 26 is closed, and then remains off until another command is given by the three-position switch as the three-position switch automatically switches back to the off position from the momentary position.

Figure 2:
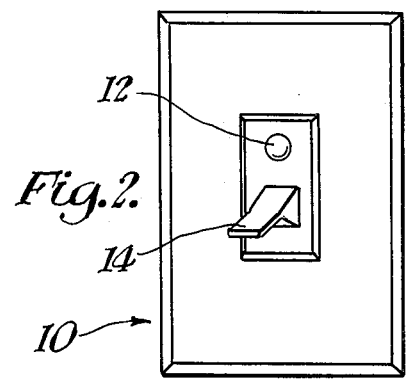
FIG. 2 is a front view of the three-position switch of the remote control head.
Figure 3:
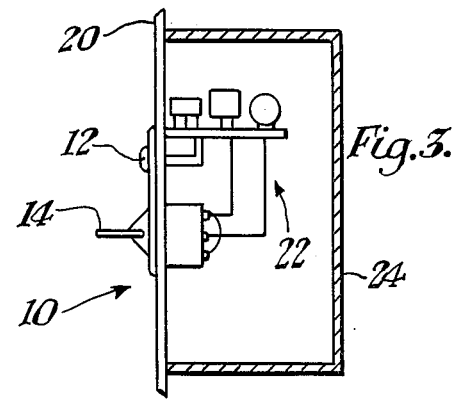
FIG. 3 is a side view of the remote control head installed in a wall box which is shown in cross-section.

Referring now to FIGS. 2 and 3 the remote control head 10 or first control means is designed to be used in a standard wall box 24. The remote control head 10 is designed such that the electronic components 22 will fit easily within the wall box 24 in that a wall box space 20 can be used which enables access to the three-position switch 14 and the light emitting diode 12.

The light emitting diode 12 or any other compatible indicating means is able to convey three messages indicating the status of the electric water heater 18. The LED 12 flashes when the three-position switch 14 is in the OFF position and the thermostatic switch 26 of the electric water heater 18 is closed indicating that the water temperature in the electric water heater 18 is below that set on the thermostatic switch 26. When the three-position switch 14 is placed either in the ON position or in the momentary position and the thermostatic switch 26 is closed, the LED 12 will be energized continually indicating that water in the electric water heater 18 is presently being heated. Finally, a deenergized LED 12 indicates that the temperature of the water in the electric water heater 18 is higher than the thermostat setting causing the thermostat switch 26 to be open and no energy is being consumed by the water heater 18.

Figure 4:
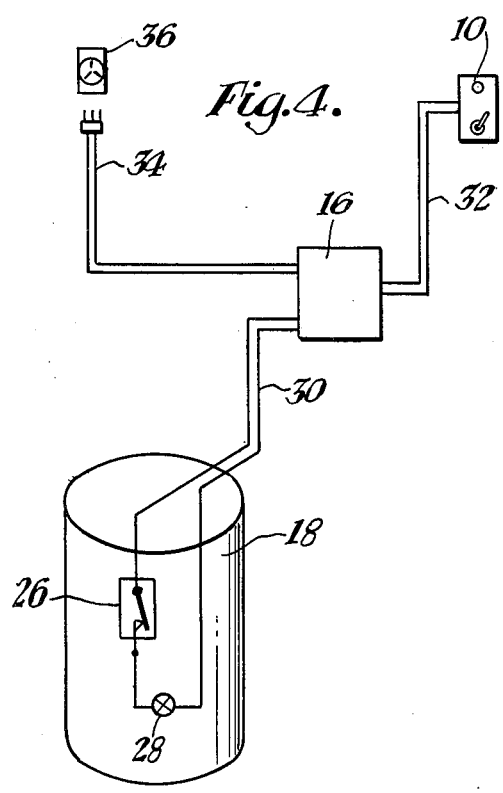
FIG. 4 is a general view of a water heater system utilizing the remote control device.
Figure 5:
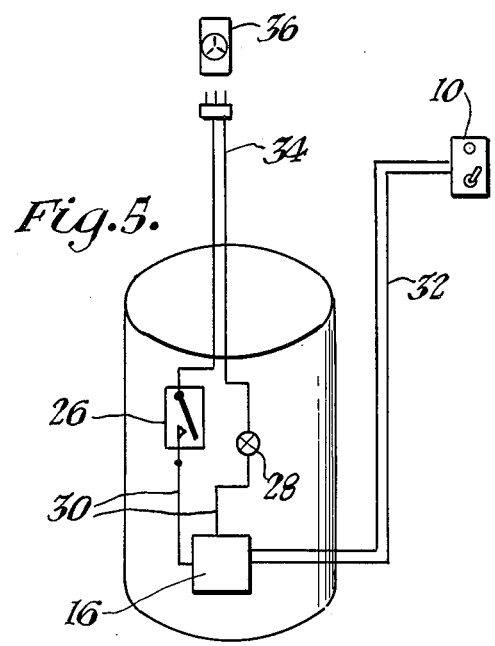
FIG. 5 is an alternate embodiment of the system shown in FIG. 4.

Referring to FIG. 4, the water heater 18 has a thermostatic switch 26 and a heating element 28 contained therein. The power cable 30 from the water heater 18 is connected into an output of the remote controlled heater switch 16. The remote control 10 is connected to the remote controlled heater switch 16 by way of the control cable 32. Since the control cable 32 carries low voltage and current (class two) no conduit is required and the control cable 32 can be installed without an electrician. Power is supplied to the remote controlled heater switch 16 by way of the power cable 34 which is plugged into a standard electrical wall socket 36. In an alternate embodiment, as shown in FIG. 5, the remote controlled heater switch 16 can also be built into the water heater 18 (instead of installed externally).

Figure 6:
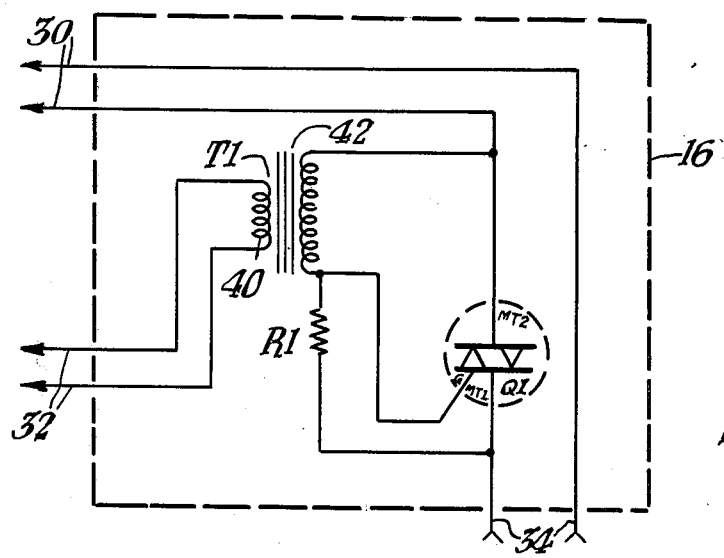
FIG. 6 is a schematic diagram of the remote controlled heater switch.

Referring to FIG. 6, the remote controlled heater switch 16 or second control means is essentially a three component device comprising a TRIAC Q1, a transformer T1 and resistor R1. The switch 16 is located near the water heater (not shown) and has two AC power-in wires 34, two AC power-out wires 30 and a pair of control wires 32 which are remotely connected to the remote control head (not shown).

The AC pass element is the TRIAC Q1 and can be mounted on a heat sink (not shown). As long as the secondary winding 40 of the isolation/switching transformer T1 does not reflect a low impedance into T1's primary winding 42, Q1 will remain off. Q1's off state is insured by the high impedance of T1's primary winding 42 which maintains the gate current below the necessary level to turn Q1 on. Much of the small primary current which does exist is shunted away from Q1's gate by resistor R1, which in the preferred embodiment is 100 ohms.

However when the remote control head (not shown) presents a low impedance through the control wires and onto T1's secondary winding 40, that low impedance is reflected into T1's primary winding 42, allowing considerable current to flow through Q1's gate electrode. The large gate current causes Q1 to turn on allowing AC current to flow between Q1's MT1 and MT2, through the power-out wires 30 to the water heater (not shown).

The transformer T1 isolates the remote control head from the high voltage of the switch 16 and reduces the normal 220 VAC power to approximately 12.6 VAC. This enables the safe use of lightly insulated, inexpensive, control wires between the remote control head and the switch 16.

Figure 7:
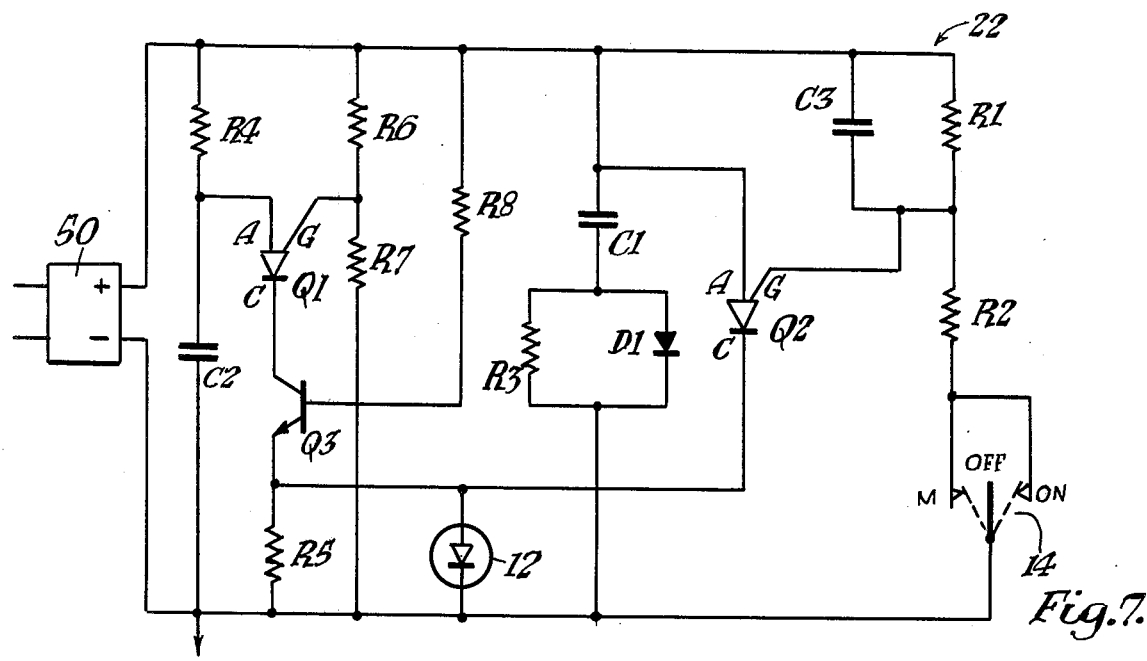
FIG. 7 is a schematic diagram of the remote control head.

Referring to FIG. 7, the remote control head circuit 22 is designed such that when the thermostatic switch of the water heater is open, no power is provided to the remote control head or first control means and it is therefore inactive.

However, when the thermostatic switch closes, and the switch 14 is off, 12.6 VAC is rectified by full wave bridge rectifier 50 which causes about 21 volts DC to be stored across filter capacitor C1 having a value of 150 micro-farads and charging diode D1, such as a IN4148 or any other compatible model.

The 21 volts is also impressed across the circuitry of Programmable Unijunction Transistor Q1 such as a 2N6027 or any other compatible model. Resistors R6 and R7 divide the 21 volts, for Q1's gate, to about 16 volts and have respective values of 2.2K ohms and 5.1K ohms. When capacitor C2 which has a value of 47 micro-farads charges to slightly more than 16 volts, through R4 having a value of 33K ohms, the anode of Q1 will begin to conduct to the cathode.

Transistor Q3, such as a 2N3904 or any other compatible model, limits the current through Q1 to about 20 milliamperes, which lights LED 12. Since this current is actually supplied by discharging capacitor C2 it is only transient. When C2 is nearly discharged not enough current is available to sustain Q1's conduction and Q1 cuts off. This begins a new charge/discharge cycle for C2. As a result of its charging and quick discharging C2 provides spurts of energy to the LED 12, which causes the LED 12 to flash.

When the switch 14 is closed, transistor Q2's (Q2 being an equivalent of Q1) gate voltage drops and Q2 begins to discharge C1, having a value of 150 microfarads through the LED 12. Resistor R3, having a value of 1K ohm, limits C1's initial discharge current to a safe value for the LED 12. When C1 discharges to about 2.3 volts the LED 12 will begin to cut-off, however, resistor R5, having a value of 1K ohm, will conduct around the LED 12, providing sustaining current for Q2 which does not cut-off even though switch 14 may open again.

As long as Q2 conducts, the bridge rectifier 50, will be shunted by Q2 and the LED 12 and therefore C1 will not fully recharge. It will, however, recharge to the full cut-off voltage of the LED 12, about 1.5 volts, at the beginning of each half cycle of the AC. The 1.5 volt charge is enough to sustain Q2 between the zero crossings of the AC.

As a result of shunting the bridge rectifier 50, the LED 12 receives spurts of energy at the beginning of each half cycle of the AC power source and appears to glow continuously.

When the thermostatic switch (not shown) cycles open and closed again the LED 12 will either begin to flash if the switch 14 is in the off position, or will glow and heat water again, if the switch 14 is in the ON position.

Figure 8:
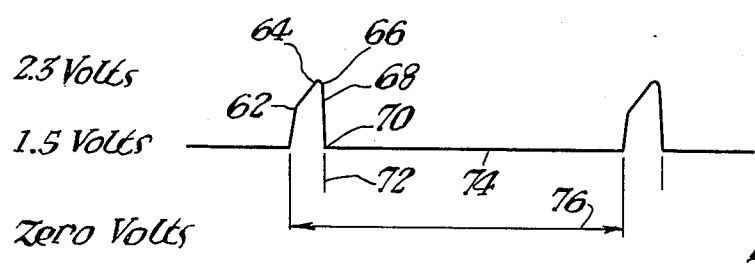
FIG. 8 is a low impedance wave form of the remote control head.

Referring now to FIG. 8, the wave form across the full wave bridge rectifier 50 (FIG. 7) when the rectifier 50 is shunted by transistor Q2 and the LED 12 or by the transistor Q2 and the resistor R5, is shown at 60. At 62, the LED 12 (FIG. 7) begins to turn on and at 64 is fully on, beginning to clamp further rise. At 66, the triac (FIG. 6) conducts due to the low input impedance of the full wave bridge rectifier caused by the low impedance of the transistor Q2 and the LED 12 (FIG. 7). At 68 the LED 12 and the transistor Q2 discharge C1 after the triac cuts power to the remote control head 10 (FIG. 1). At 70 LED 12 cuts off. At 72 undershoot due to collapse of the transformer T1 (FIG. 6) fields occurs. The residual charge on the capacitor C1, sustains the transistor Q2 for one-half of the cycle 74. One-half of a cycle equals $0.833 \times 10^{-3}$ seconds for 60 hertz power and is represented by the distance 76.

Industrial Applicability

The device is designed to be easily installed in homes presently using an electrical water heater or electrical/solar water heater combination.

I claim:

1. A remote control device for controlling the mode of operation of an electrical water heater, comprising: a thermostatically controlled switch, said thermostatically controlled switch having an open position and a closed position, said thermostatically controlled switch electrically coupled to a power source through a power cable; an electrical water heater having a heating element, said heating element connected within said water heater and electrically coupled to said thermostatically controlled switch; an indicating means for indicating the status of said water heater; a first control means for manually selecting the mode of operation of said water heater and controlling said indicating means, said first control means includes a multi-positional manual switch having at least a first position, a second position and a third position; said indicating means electrically coupled to said first control means; a second control means for controlling the power to said water heater, said second control means having at least a first pair of control terminals, a first output and a first input, said second control means controlled by said first control means; said first pair of control terminals electrically coupled to said first control means; said first input electrically coupled to said power source; said first output electrically coupled to said electric power cable, said second control means maintaining said water heater in an off condition when said manual switch is in said first position; said second control means allowing said water heater to turn on for one heating cycle whenever said thermostatically controlled switch is closed and said manual switch is in said second position; said second control means allowing said water heater to operate in the conventional mode controlled solely by said thermostatically controlled switch, whenever said manual switch is in said third position.

2. A remote control device for controlling the mode of operation of an electrical water heater as set forth in claim 1, wherein: said manual switch automatically returns from said second position to said first position.

3. A remote control device for controlling the mode of operation of an electrical water heater as set forth in claim 1, wherein: said indicating means conveys at least a first message, a second message and a third message; said first message indicating that said thermostatically controlled switch is closed, but said heating element is inactive; said second message indicating that said thermostatically controlled switch is closed and said heating element is active; said third message indicating that said thermostatically controlled switch is open and said heating element is inactive.

4. A remote control device for controlling the mode of operation of an electrical water heater as set forth in claim 3, wherein: said indicating means is a light emitting diode; said first message being conveyed by a flashing signal from said light emitting diode, said second message being conveyed by constant energization of said light emitting diode; and said third message being conveyed by constant deenergization of said light emitting diode.

5. A remote control device for controlling the mode of operation of an electrical water heater as set forth in claim 3, wherein: said first control means includes a rectifier means for rectifying a signal from said first output having a rectifier input and a rectifier output, said rectifier input electrically connected to said first output; a first driving means for driving said indicating means to convey said first message, said first driving means electrically coupled to said rectifier output; a second driving means for driving said indicating means to convey said second message, said second driving means electrically coupled to said rectifier output; said second control means includes a transformer means for changing the power from said power source, said transformer means having a first pair of output terminals, a first input terminal and a third output terminal, said first pair of output terminals connected to said first pair of control terminals and said third output terminal electrically connected to said first output; a switching means for monitoring said transformer means and conducting power to said water heater under preselected conditions, said switching means having a first switching means input, a second switching means input and first switching means output, said first switching means input electrically coupled to said first input, said second switching means input electrically coupled to said first input terminal and said first switching means output electrically connected to said first output.

6. A remote control device for controlling the mode of operation of an electrical water heater as set forth in claim 5, wherein: said rectifier means is a full bridge rectifier; said first driving means is a transistor circuit; said second driving means is a transistor circuit; said transformer means is an isolation/switching transformer and said switching means is a triac having a shunt resistor across its gate.

* * * * *